United States Patent

[11] 3,609,597

[72] Inventor Laurence Stanley Moye
Harlow, Essex, England

[21] Appl. No. 791,832
[22] Filed Nov. 21, 1968
[45] Patented Sept. 28, 1971
[73] Assignee International Standard Electric Corporation
New York, N.Y.
[32] Priority Dec. 7, 1967
[33] Great Britain
[31] 55743/67

[54] SELF-ADAPTIVE EQUALIZER FOR TIME-VARYING CHANNELS
3 Claims, 3 Drawing Figs.

[52] U.S. Cl. .......... 333/18, 333/28 R
[51] Int. Cl. .......... H04b 3/04
[50] Field of Search .......... 333/18, 28, 70 T

[56] References Cited
UNITED STATES PATENTS
3,268,836 8/1966 Linke .......... 333/28 X
3,477,043 11/1969 Farrow .......... 333/28 X

*Primary Examiner*—Herman Karl Saalbach
*Assistant Examiner*—Paul L. Gensler
*Attorneys*—Walter H. Baum, C. Cornell Remsen, Jr., Raymond P. Morris, Percy P. Lantzy, J. Warren Whitesel and Delbert P. Warner

ABSTRACT: A self-adaptive equalizer is provided for use on switched telephone networks or other time-varying channels used for the transmission of digital signals. Continuous equalization of a time-varying channel is provided.

Inventor
L. S. MOYE
By D. P. Warner
Attorney

SELF-ADAPTIVE EQUALIZER FOR TIME-VARYING CHANNELS

This invention relates to equalizers for time-varying channels such as switched telephone channels used for the transmission of digital data.

When a digital signal is transmitted over a dispersive channel, interference between the digits occurs which increases the probability of error in the receiver. To reduce or even cancel such intersymbol interference an equalizer is used at the receiver. This is a network designed to relate signals received at any one instant with preceding and succeeding signals and so build up a resultant signal output in which the interferences are effectively cancelled. One form of equalizing network consists of a tapped delay line into which the incoming signals are fed. The tapping point outputs are added in varying proportions.

According to the invention there is provided an equalizer, for a time varying channel, including a forward portion and a feedback portion, each portion including a first tapped delay means into which an input signal is fed, the tapped outputs of a portion being added together in varying proportions, the added outputs from each portion being added together, a detector circuit the input of which is the combined outputs of the two portions, the input to the forward portion being an incoming signal from the channel, the input to the feedback section being the output of the detector, the equalizer also including means for deriving an error signal being the difference between the input and the output of the detector and means for altering according to a function of the error signal the varying proportions in which the tapped delay outputs are added together.

The above-mentioned and other features of the invention and the manner of attaining them will become more apparent and the invention itself will be best understood by reference to the following description taken in conjunction with the accompanying drawings, in which.

In dealing with intersymbol interference in digital signals, which are sampled at discrete intervals in the receiver, it is only necessary to consider the signals at the sample times.

If the transmitted sequence is ($\ldots x_{n12}, x_{n11}, x_n, x_{n+1}\ldots$) and the received sequence is ($\ldots y_{n12}, y_{n11}, y_n, y_{n+1}, y_{n+2}\ldots$) we can represent the relation between them by $$y_n=\sum_{r=0}^{N} x_{n-r}\cdot a_r$$

where $a_r$ represents constant coefficients determined in accordance with settings of a tapped delay line or the like and where $y_n$ only involves past values of $x$. In theory, of course, N is infinite, but in practice it can always be considered finite.

Figure 1:
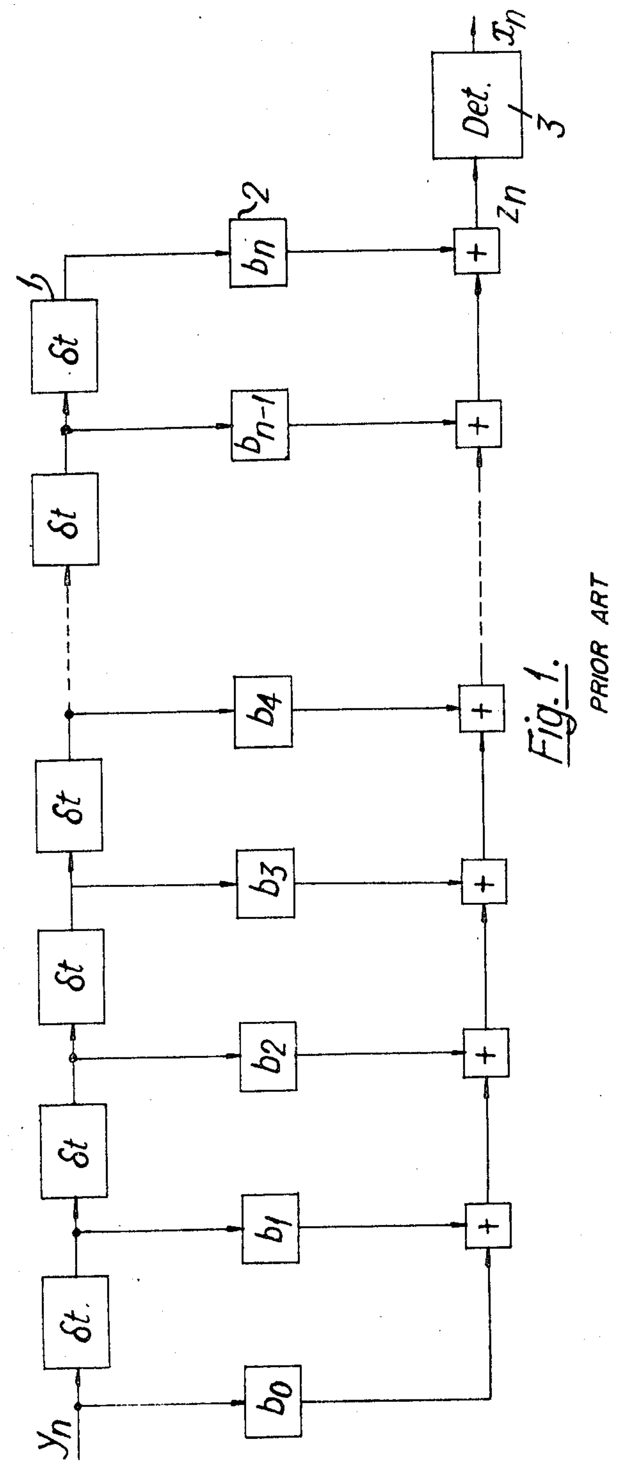
Fig. 1. PRIOR ART
FIG. 1 illustrates a static equalizer using a tapped delay line.

The conventional sort of equalizer is shown in FIG. 1. The received signal is delayed in a tapped delay line 1 tapped at the sample period $\delta t$, and the tap outputs are added in varying portions $b_s$ determined by tap gain/attenuators 2, each of which has its individual value $b_0, b_1, b_2\ldots b_{n11}, b_n$.

The output of the equalizer is, therefore, $$z_n=\sum_{s=0}^{M} y_{n-s}.b_s$$

$$=\sum_{s=0}^{M}\sum_{r=0}^{N} x_{n-r-s}.a_r.b_s$$

If it can be arranged that the coefficients of $x_{n1s}$ in this equation are zero for all $r$ but one, say $r=k$, and that the coefficient of $x_{n1k}$ is unity, then we shall get, $$z_n=x_{n1k}$$

It is obvious that, in general, this is not possible as there are M+N equations governing the coefficients of the $x_{n1p}$ but only M of the variables $b_s$ to satisfy these equations. Normally the best that can be done is to reduce the remaining intersymbol interference in $y_n$ to a minimum. If the dispersion of the channel is very great, this minimum will still be inadequate for satisfactory transmission and a lower transmission rate must be used.

The reason for the imperfection in this method of equalization is that the received samples adjacent to the main sample are used to cancel the intersymbol interference in the main sample, but these samples are themselves confused by intersymbol interference from more distant samples. In order to improve on this performance, use is made of the fact that when $y_n$ is received, $z_n$ is an approximation to $x_{n1k}$. All values of $x_q$ for $q<n-k$ are therefore available at the output of the detector 3 with, one hopes, negligible error. These samples are free from noise and intersymbol interference and can be used to advantage to cancel exactly the intersymbol interference from them in $y_n$;

$$z_n'=y_n-\sum_{r=k+1}^{N} x_{n-r}.a_r$$

$$=\sum_{r=0}^{k} x_{n-r}.a_r$$

There is now only the intersymbol interference caused by $a_r$, $r\leq k$ to be cancelled by the forward equalizer which therefore needs fewer taps.

Figure 2:
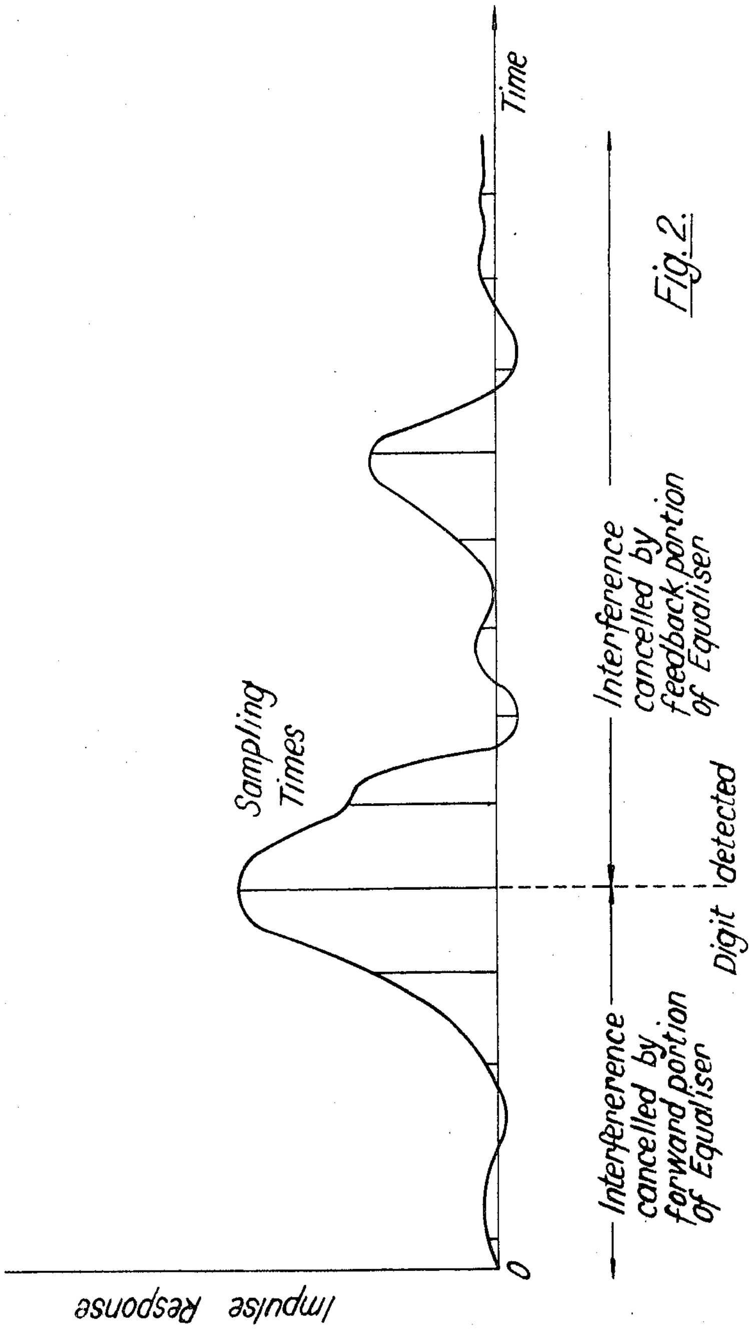
FIG. 2 illustrates a typical channel impulse response of a dispersive channel.

If the impulse response of the channel is as shown in FIG. 2, in which the main part of the response follows the main sample, then all but the small amount of intersymbol interference caused by that part which precedes the main pulse can be cancelled completely by a feedback equalizer and there is very little left to be imperfectly cancelled by the forward portion of the equalizer.

Figure 3:
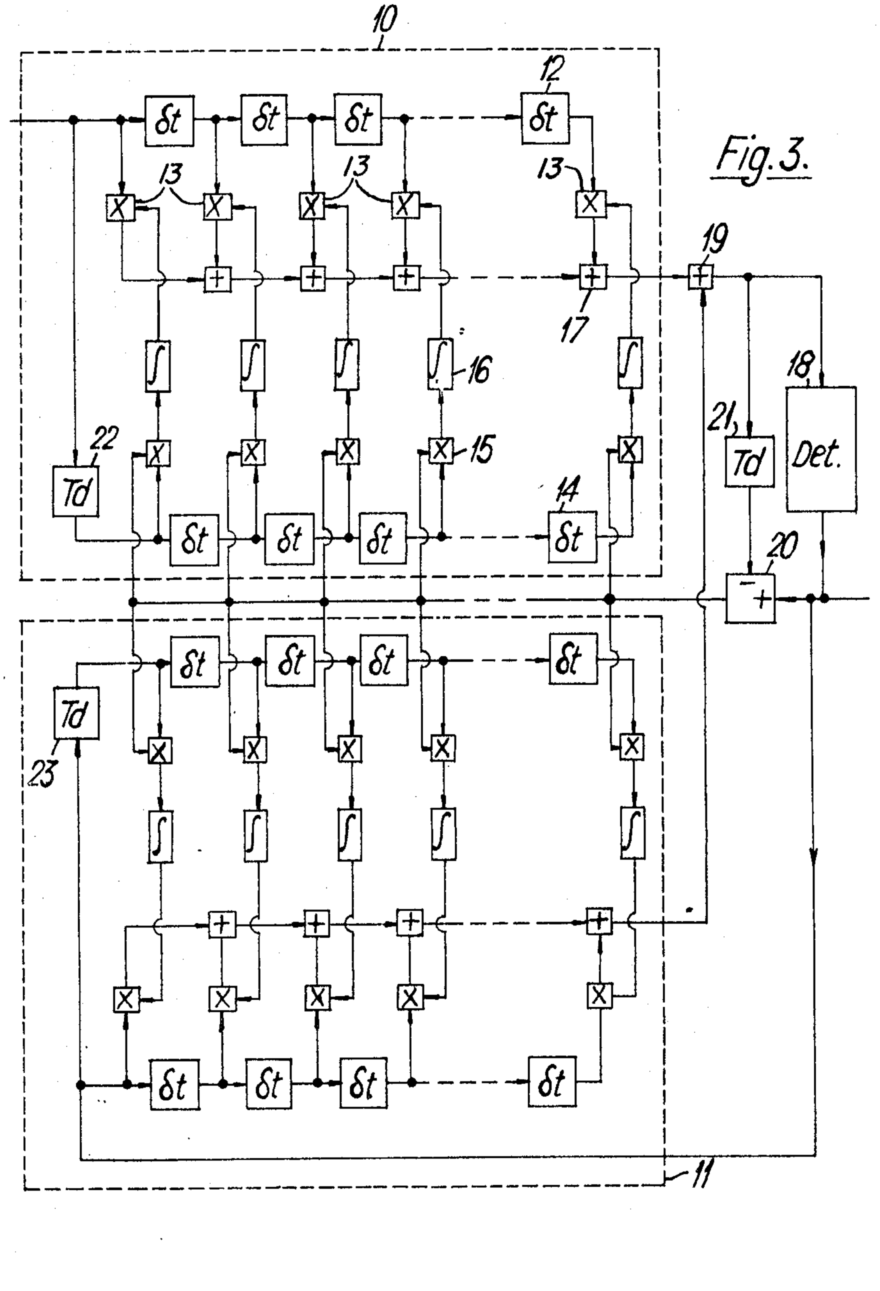
FIG. 3 illustrates a self-adaptive decision feedback equalizer according to the invention.

To derive a self-adaptive form of decision feedback equalizer, the principles used to make conventional self-adaptive equalizers and self-adaptive echo suppressors are applied to the arrangement shown in FIG. 3. The output of each tap on the two tapped delay lines is multiplied by the error between the equalizer output and the detector output which is the ideal equalizer output.

The equalizer of FIG. 3 is split into two basic portions, a forward portion 10 and a feedback portion 11. The forward portion consists of a first tapped delay line 12, tapped at intervals of $\delta t$, the tap outputs being modified by individual tap gain multipliers 13. The incoming signal from the channel is fed to both the first delay line 12 and a second similar delay line 14. The outputs from the second delay line 14 are multiplied, by an error signal derived from the equalizer output, in multipliers 15. The multiplied outputs are then integrated by individual integrator circuits 16 and the integrated outputs are applied to the multipliers 13 to modify the output of delay line 12. The modified outputs are then added together by adders 17 and the total output is passed to a detector 18.

The feedback portion 11 is identical to the forward portion 10 but has for its input the output of the detector 18, and the output of the feedback portion 11 is added to the output of the forward portion 10 by the adder 19.

The error signal, which is applied to both portions 10 and 11, is the difference between the input to and the output from the detector 18. It is derived by means of the comparator circuit 20 and fed to each of the multipliers 15 in the forward portion and the corresponding multipliers in the feedback portion.

Since there is a delay T$d$ between the detector input and the detector output the input (equalizer output) must be delayed by a similar amount in order that the error signal shall be a true error signal. Therefore a delay circuit 21 is inserted between the input to the detector 18 and the comparator 20. Also it is necessary to delay the inputs to the tapped delay line 14 in the forward portion and the corresponding tapped delay line in the feedback portion by similar amount in order that their tapped outputs shall bear the correct relationship to the error signal. So delays 22 and 23 are inserted in the respective inputs.

The constant of proportionality in the circuit (which in effect is the time constant of the integrators) must be below a certain value if absolute convergence is to hold. If it is above this value the self-adaptive arrangement overcorrects and so takes longer to reach its optimum condition. There is an optimum value for this constant under ideal conditions, and if it is set to this optimum value the equalizer converges so that the mean error in its output decreases on average by 6 db. for every sample of the signal.

The presence of noise added to the received signal can be shown to prevent the absolute convergence of the system. With noise present, the characteristics of the equalizer will never settle finally at an optimum condition but will wander in a constrained random manner around the optimum condition. To reduce this wander the time constant of the system must be increased with the result that it will take longer to adapt in noisy conditions. By making the time constant sufficiently long this "wander" can be reduced as much as required, and always the system will be less affected by noise than a non-feedback equalizer because the feedback part of the equalizer uses a noise-free signal.

The optimum state of an equalizer with a noisy input is not the same as that of one with a noise-free input because every tap of the equalizer, in adding its delayed version of the signal into the output, adds whatever noise is present in this signal as well. The signals act together to cancel out the intersymbol interference, but the noises just add. Thus the minimum error in the output is obtained by trading off some of the cancellation of intersymbol interference against the added noise by reducing the tap gain settings slightly below the noise-free optimum settings. This compensation is automatically made by the self-adaptive equalizer; in fact, under any conditions, it adapts to reduce the error in its output to a minimum regardless of the cause of this error.

The effect of digital errors on the system appears at first sight to be very unpleasant. Errors occur when a signal is received which shows up the error in the equalizer characteristics most readily, but the digital error causes the difference between the equalizer output and the detector output to be of the wrong polarity. The correction that is made to every tap-gain setting is in the opposite direction to that which is required. Thus signals which, if they did not give rise to digital errors, would cause the most favorable adaptation of the system have the reverse effect. Fortunately, for every signal like this which causes a digital error and a misadaptation, there is another signal which causes an even greater correct adaptation.

It is to be understood that the foregoing description of specific examples of this invention is made by way of example only and is not to be considered as a limitation on its scope.

I claim:

1. An equalizer, for a time-varying channel, comprising a forward portion and a feedback portion, each portion including a first tapped delay means into which an input signal is fed, each portion including a plurality of tapped output terminals connected to said first tapped delay means to provide tapped output signals, adding means for adding the tapped output signals of a portion together in varying proportions to provide added outputs, means for adding the added outputs from each portion together to form a combined output, a detector circuit having an input terminal to receive the combined output and provide a single output signal, the input signal to the forward portion being an incoming signal from a channel, the input signal to the feedback portion being the output signal of the detector, means connected to derive an error signal proportional to the difference between the input signal to the detector and the output signal from the detector, and means responsive to a function of the error signal for altering the varying proportions in which the tapped delay output signals are added together.

2. An equalizer according to claim 1 in which each portion includes a second tapped delay means similar to the first, the input signal to the second delay means is substantially the same as the input signal to the first tapped delay means, means multiplying tapped output signals of the second delay means by the error signal, means separately integrating the resultant multiplied output signals of the second delay means, and means multiplying the integrated output signals by the corresponding tapped output signal of the first delay means to vary the proportions of the latter before it is added to the other multiplied tapped output signals from the first delay means.

3. An equalizer according to claim 2 in which a delay means is placed to delay an input signal to the means for deriving the error signal, this input signal being the same as the input signal to the detector, the delay being equal to the natural delay between the detector input and output, and similar delay means are placed in the inputs to the second tapped delay means in both the forward and feedback portions of the equalizer.